Aug. 15, 1967 J. W. NEUMANN 3,335,839
CONVEYING MACHINE
Filed Sept. 26, 1966 6 Sheets-Sheet 1

INVENTOR.
John W. Neumann
BY
Harness, Dickey & Pierce
ATTORNEYS.

Aug. 15, 1967     J. W. NEUMANN     3,335,839
CONVEYING MACHINE

Filed Sept. 26, 1966     6 Sheets-Sheet 4

INVENTOR.
John W. Neumann
BY
Harness, Dickey & Pierce
ATTORNEYS

United States Patent Office 3,335,839
Patented Aug. 15, 1967

3,335,839
CONVEYING MACHINE
John W. Neumann, Birmingham, Mich., assignor to The Udylite Corporation, a corporation of Delaware
Filed Sept. 26, 1966, Ser. No. 581,836
5 Claims. (Cl. 198—19)

ABSTRACT OF THE DISCLOSURE

A conveying apparatus for transferring work racks through a series of treating stations, including a carriage mounted on rails affixed to a frame and projecting laterally therefrom over the treating stations, and which carriage includes a lift member thereon for engaging and suspending a work rack therefrom. Movement of the carriage along the rail is achieved by a longitudinally extending drive coupled to the carriage, while movement of the lift member on the carriage to and from a raised position and a lowered position is achieved by driven means on the carriage slidably coupled in all moved positions of the carriage to a second power source extending longitudinally of the rails. A central control system controls the energization of the carriage drive and the lift member drive so that the work racks are transferred by the lift member on the carriage through the several treating stations in a preselected ordered sequence.

---

The present invention broadly pertains to work handling apparatuses, and more particularly to an improved work handling machine for use in conveying workpieces through a series of liquid treating stations in an automatic sequentially phased operating cycle.

Conveying apparatus of the general type to which the present invention is applicable are in widespread commercial use for automatically transferring the workpieces between successive manufacturing operations and, specifically, for conveying workpieces through a preselected processing cycle such as an electro-chemical or electroplating cycle, for example. An increasing need has arisen for conveying machines of the foregoing type which are adaptable for conveying bulk quantities of relatively small workpieces through various electroplating processes for applying substantially uniform metallic coatings of high cost in relatively critical amounts on the surfaces thereof. Workpieces of the foregoing type are finding increased use in the construction and assembly of complicated computer systems, as well as components of electronic apparatuses of varying types, wherein the solutions employed in the process cycle must, of necessity, be controlled within relatively narrow limits and wherein contamination of such solutions represents a serious problem.

There have also been problems associated with conveying machines of the types heretofore known in that they lack sufficient flexibility to provide for quick and simple variations in their automatic work transfer cycles in order to adapt the machine for processing workpieces which are to be subject to different processing cycles. It has been necessary in the past to subject a machine to relatively drastic mechanical modifications in order to effect a deviation in its operating cycle enabling the machine to be employed for processing different types of workpieces. Such mechanical modifications have occasioned shut down of a machine for substantial time periods resulting in a substantial reduction in its operating efficiency and requiring skilled manpower for effecting such a modification.

It is, accordingly, a principal object of the present invention to provide an improved conveying apparatus which overcomes the problems and disadvantages of conveying apparatuses of similar type heretofore known.

Another object of the present invention is to provide an improved conveying machine incorporating an upright frame on which a combination lift and transfer mechanism or carriage is movably mounted in a cantilever arrangement providing for increased access to the treating stations and the workpieces located at such treating stations disposed along the path of travel of the carriage.

Yet still another object of the present invention is to provide an improved conveying machine incorporating power means extending longitudinally along the path of travel of the carriage for supplying power to the carriage in all moved positions thereof for effecting a raising and lowering of workpieces over the treating stations as well as for their transfer between stations.

A further object of the present invention is to provide an improved conveying machine of a construction wherein the operating components thereof are readily adaptable for enclosure within a housing preventing exposure of the operating components to the atmosphere in which the apparatus is employed.

A still further object of the present invention is to provide an improved conveying machine wherein the treating stations are adapted to be enclosed within a housing into which the lift and transfer mechanism extends in a movably sealed relationship so as to provide for a ventilation of the fumes, gases, and other contaminating substances associated with the treating stations to a remote point of the atmosphere avoiding thereby contamination of the working environment in which the machine is employed.

Yet still a further object of the present invention is to provide an improved conveying machine including means for selectively opening and closing communication of a work station for enabling the withdrawal or placement of workpieces at that station and which closure means are operable in response to the movement of the lift and transfer mechanism relative to such stations.

Still another object of the present invention is to provide an improved conveying machine which is of simple design, of economical construction, and of simple and durable operation.

The foregoing and other objects and advantages of the present invention are achieved by a conveying machine incorporating rail means on a frame which extends adjacent and longitudinally of a series of treating stations having work rack supporting means located at each station for receiving and removably supporting workpieces that are to be subjected to a prescribed treatment. A combination lift and transfer mechanism or carriage is guidably and movably mounted on the rail means and extends in a cantilever fashion therefrom over the treating stations. The carriage incorporates work rack-engaging means thereon for engaging and transferring work racks to the several work rack supporting means along the stations. Drive means are provided on the machine framework which are drivingly coupled to the combination transfer and lift mechanism in all move positions thereof for selectively moving the transfer means above the treating stations and the lift means vertically above an individual station for effecting a preselected transfer of the work racks through the several stations. Suitable sensing means are located along the path of travel of the carriage for signaling the disposition of the carriage relative to the treating stations and controlling the energization and de-energization of the several drive means. It is also contemplated in accordance with the practice of the present invention that a housing encompassing the treating stations can be employed in which the combination transfer and lift means are movably sealed and wherein the interior of the housing is disposed in communication with ventilation means for withdrawing the contaminating vapors and gases and ejecting them at a point remote from the machine environment.

Other objects and advantages of the present invention will become apparent from the following detailed description taken in conjunction with the accompanying drawings, wherein:

FIGURE 9 is a schematic diagrammatic view of the control system for effecting an automatic sequentially phased operation of the several operating components of the conveying machine.

Figure 1:
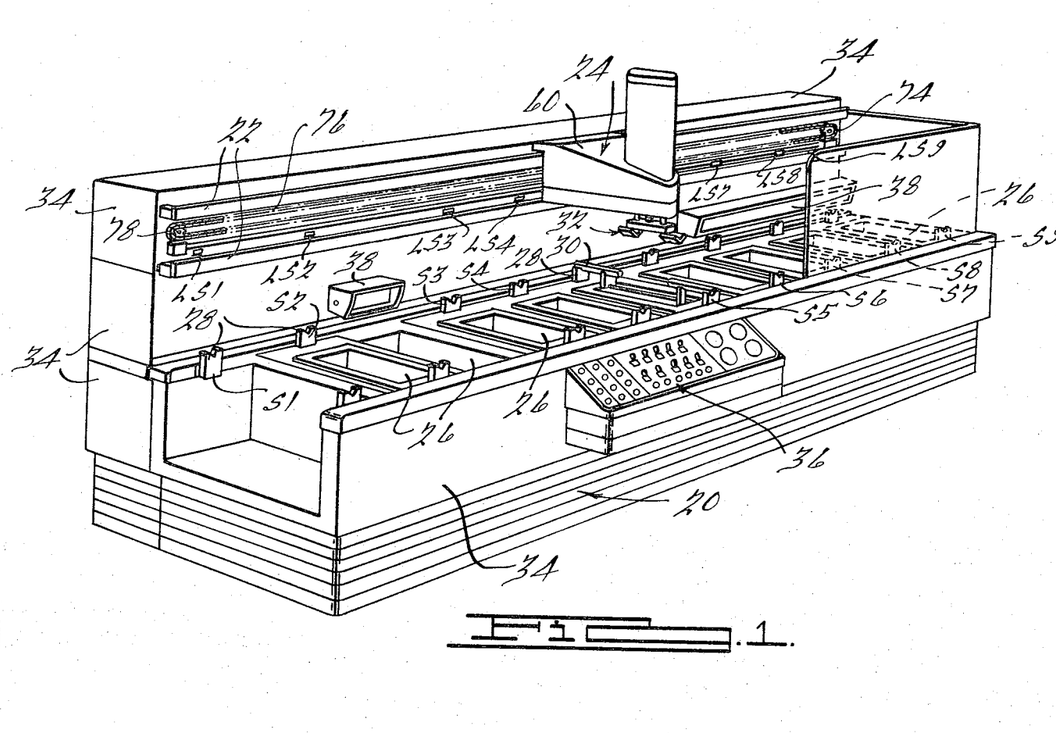
FIGURE 1 is a perspective view of a conveying machine constructed in accordance with the preferred embodiments of the present invention.

Referring now in detail to the drawings and as may be best seen in FIGURE 1, the conveying machine comprising the present invention consists of a generally L-shaped framework 20 to the upper and forward face of which a pair of supporting rails 22 are fixedly disposed on which a carriage 24 is movably mounted and projects therefrom in a cantilever arrangement. The carriage 24 extends above a series of aligned treating stations as defined in the exemplary embodiment shown in FIGURE 1 by a series of treating receptacles or tanks 26. Work rack supporting means or V-blocks 28 are disposed in aligned relationship adjacent to each of the tanks 26 and which are adapted to receive the projecting end portions of a work rack 30 when it is disposed in the fully lowered position at that station. The carriage 24 incorporates a vertically movable work rack engaging device 32 which is adapted to engage the work racks 30 and effect a lifting thereof to a raised position in order that the work racks can be transferred over the partitions separating adjoining treating tanks.

In the typical arrangement as illustrated in FIGURE 1, the machine incorporates nine aligned treating stations numbered S1 through S9 inclusive, through which the work racks 30 are transferred in accordance with a preselected automatic sequentially phased operating cycle. Conventionally, station S1, located at the left hand end of the machine as viewed in FIGURE 1, is employed as the load station at which station work racks incorporating fresh workpieces to be processed are positioned and are removed therefrom by the work rack engaging device 32 on the carriage 24 and are conveyed through the remaining stations S2 through S9. At the completion of the treating cycle, the conveying machine is effective to return each of the work racks to station S1, at which they are removed and replaced with new work racks incorporating additional workpieces to be processed. The loading and unloading of work racks at station S1 can be achieved manually or by employing a suitable automatic loading and unloading device of the several types well known in the art.

During the operation of the conveying machine, the automatic cycle thereof can be monitored by an operator positioned at a control console 36 conveniently located along the forward midpoint of the machine which is provided with a series of controls for selectively interrupting the automatic operating cycle as may be desired for one or more reasons.

The conveying apparatus as illustrated in FIGURE 1 is shown in the fully assembled condition wherein the framework 20 is enclosed within a series of removable panels 34 which enclose the several driving and operating components contained within the machine framework. As will be further noted in FIGURE 1, a series of intake hoods or ducts 38 can be conveniently incorporated on the panels 34 adjacent to the treating tanks 26 which are suitably connected to conduits within the machine framework for withdrawing the vapors passing upwardly from the treating receptacles avoiding thereby any appreciable contamination of the atmosphere surrounding the machine.

Figure 2:
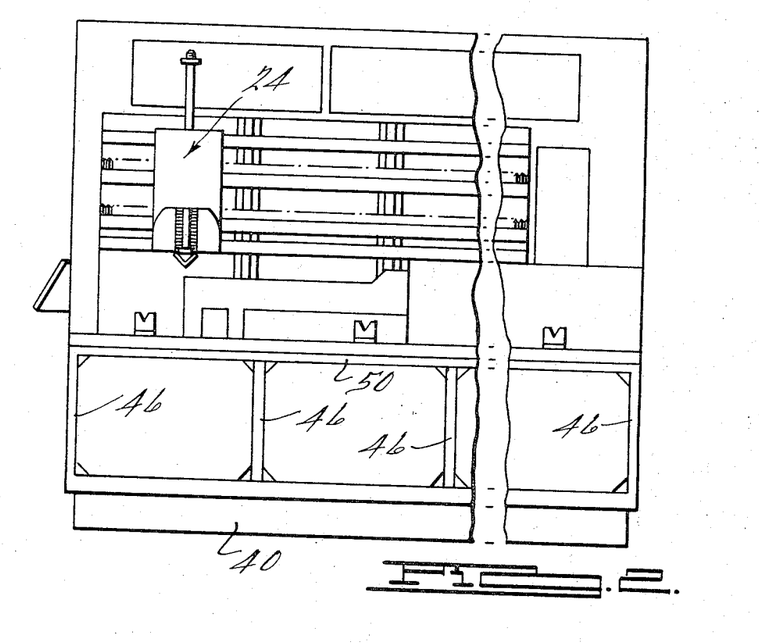
FIGURE 2 is a front elevational view of the machine shown in FIGURE 1 with the cover panels thereof removed, illustrating in particular the machine framework.
Figure 3:
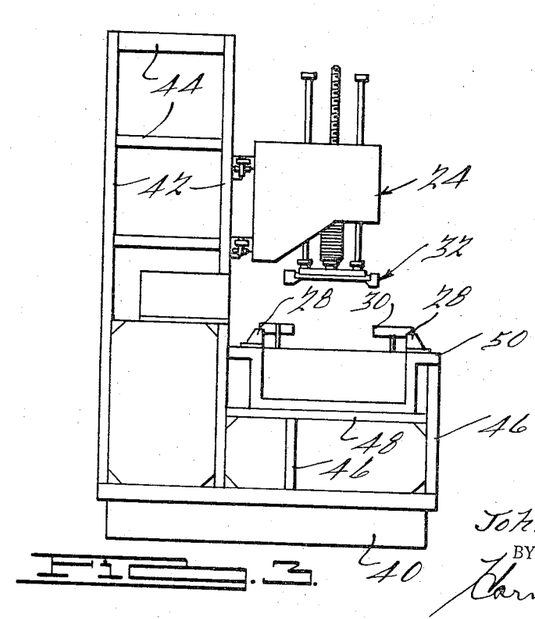
FIGURE 3 is an end elevational view of the machine framework as shown in FIGURE 2.

The structural features of the machine framework 20 are best seen in FIGURES 2 and 3 wherein the panels 34, as shown in FIGURE 1, have been removed for the purposes of clarity. The machine framework 20, as best seen in FIGURES 2 and 3, comprises a series of beams 40 which serve to form a base platform on which upright members 42 are rigidly affixed and are further rigidified by means of cross braces 44. The treating tanks are supported by a framework consisting of vertical beams 46 rigidified by transverse beams 48 as well as longitudinal member 50. The resultant machine framework 20, which is of a generally L-shaped configuration as viewed in FIGURE 3, serves to house the several control components, ventilation ducts, and drive components for effecting a coordinated operation of the carriage 24.

The structural features of the carriage 24 will now be described with particular reference to FIGURES 4, 5 and 6. As shown in these figures, the carriage 24 comprises a mounting plate 52 to the upper and lower portions of which rearwardly extending braces 54 are rigidly secured such as by means of welding, for example, and to the ends of which rollers 56 are rotatably secured which are adapted to contact the upper side edge portion and upper edge portion of the supporting rails 22. As will be noted, each of the supporting rails 22 is rigidly secured to the machine framework by means of a series of outriggers 58 which project outwardly of the machine frame and have their ends rigidly secured to the lower inner side face of the supporting rails. A suitable hood 60, as best seen in FIGURES 1 and 4, is removably secured around the carriage framework while a second hood 62 is affixed to the outer end portion of the carriage for enclosing the movable components of the lift mechanism.

Movement of the carriage 24 along the supporting rails 22 is achieved by means of a reversible transfer motor 64 which is mounted on the machine framework and is drivingly coupled to a speed reducer 66. The speed reducer 66 is in turn drivingly coupled to a pulley 68 having a flexible belt 70 trained therearound which in turn is affixed to a shaft 72 rotatably supported on the machine framework to the outer end of which a drive sprocket 74 is fixed. A suitable roller chain 76, as best seen in FIGURES 1 and 4, is trained around the drive sprocket 74 and extends around an idler sprocket 78 disposed at the opposite end of the machine. The ends of one flight of the roller chain 76 are secured by means of a suitable link 80 to a depending bracket 82 extending downwardly from the upper brace 54. Accordingly, movement of the roller chain 76 effects a corresponding movement of the carriage 24 along the supporting rails and above the several treating stations disposed therebelow.

Figure 4:
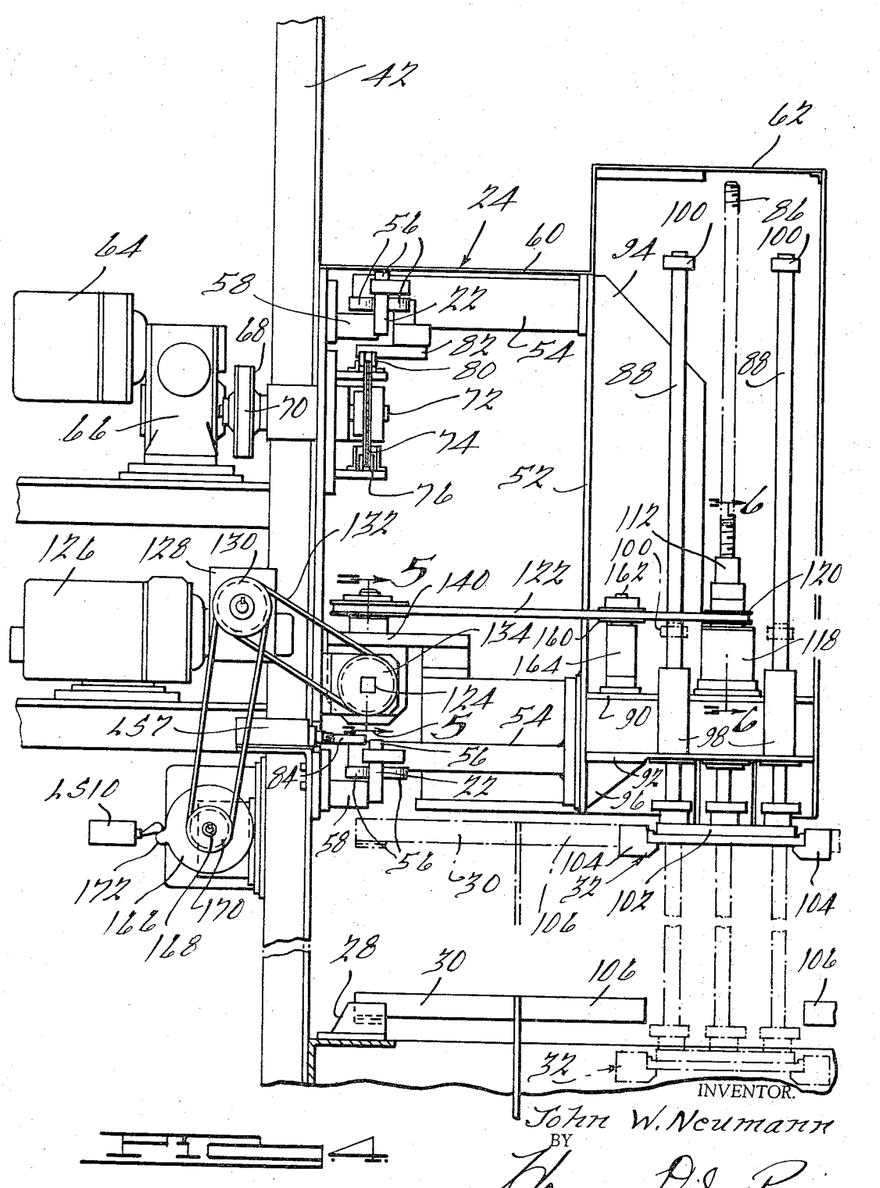
FIGURE 4 is an enlarged fragmentary side elevational view of the carriage and lift mechanism thereon.

Appropriate alignment of the carriage and the work-engaging device 32 thereon relative to the V-blocks 28 and the work racks 30 disposed at the treating stations as best seen in FIGURE 1, is achieved by means of a station limit switch such as station limit switch LS7 as shown in FIGURE 4, which is adapted to be tripped by an actuator 84 affixed to and extending rearwardly of the lower brace 54. The disposition of the station limit switches LS1 through LS9 for stations S1 through S9 respectively, is diagrammatically illustrated in FIGURE 1. Each station limit switch is electrically connected to the central control circuit in a manner subsequently to be described for signaling the control circuit of the arrival of the carriage at a specified station. A tripping of the appropriate station limit switch is effective to de-energize the reversible transfer motor 64 whereupon the lift mechanism on the carriage can be energized to effect either a lifting or a lowering of a work rack from that station. The station limit switches are also effective to signal the central control circuit that the transfer movement of the carriage has been completed in order to enable the next operating sequence to be initiated.

The lift mechanism on the carriage as may be best seen in FIGURE 4, comprises a central lift rod 86 and a pair of laterally spaced guide rods 88 which are mounted for vertical movement on a platform comprising plates 90 and 92 affixed to and projecting outwardly of the lower end portion of the mounting plate 52. The plates 90 and 92 are rigidified by means of vertically disposed brackets 94 and 96 which are affixed to the outer face of the mounting plate 52 and are secured to the plates 90 and 92 maintaining them in a substantially horizontal position. As best seen in FIGURE 4, the lift rod 86 and the guide rods 88 are movable to and from a raised position as shown in solid lines to a lowered position as shown in phantom. The guide rods 88 are slidably disposed in vertically oriented bushings 98 and are formed with collars 100 removably affixed to the upper end portions thereof which are adapted to serve as stops upon coming in contact with the upper edge portion of the bushings 98. The lower end of the guide rods 88 are affixed to the work rack-engaging device 32 in a manner as best seen in FIGURE 4. As will be noted, the work rack engaging device comprises a cross bracket 102 to the opposite ends of which V-shaped lift members 104 are rigidly affixed and which are in turn adapted to removably engage the inwardly projecting ends 106 of a work rack 30 as shown in phantom in FIGURE 4.

Figures 5, 6:
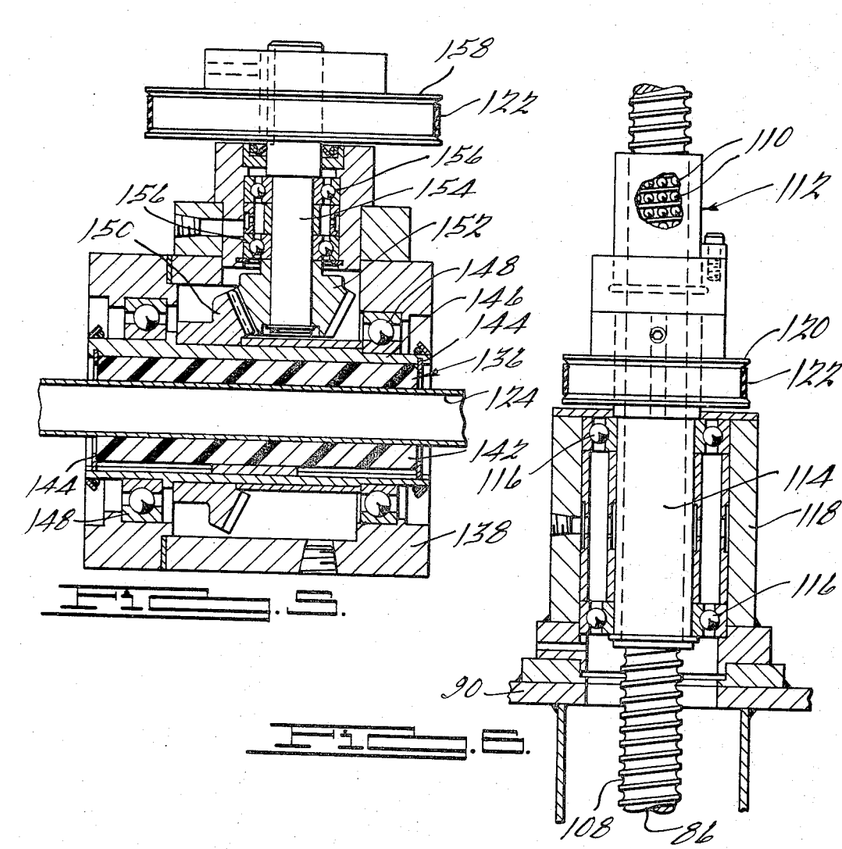
FIGURE 5 is a vertical longitudinal sectional view through the drive mechanism for effecting a lifting and lowering of the lift mechanism as shown in FIGURE 4 and taken along the line 5—5 thereon.
FIGURE 6 is a magnified fragmentary longitudinal sectional view of the lift mechanism shown in FIGURE 4 and taken along the line 6—6 thereof.

The lift rod 86, in accordance with the preferred embodiments of the present invention and as is best seen in FIGURES 4 and 6, is provided in the form of a ball screw as defined by a helical arcuate groove 108 extending upwardly around the periphery thereof which is adapted to be engaged by a series of ball bearings 110 of a ball nut 112, which is constructed in accordance with ball nut designs of the types well known in the art. The ball nut and ball screw arrangement is particularly efficient in converting torque to a lifting and lowering thrust of the lift rod in a manner as more clearly set forth below.

The ball nut 112 is securely affixed to a tubular shaft 114 which in turn is rotatably supported in a substantially vertical position by means of ball bearings 116 disposed within a cylindrical collar 118 affixed to the upper plate 90. The lift rod 86 extends through the tubular shaft 114 and is securely fastened at its lower end of the cross bracket 102 of the work rack engaging device 32. A pulley 120 is keyed or otherwise affixed to the tubular shaft 114 and around which a flexible element such as a V-belt 122 is trained for effecting a rotation of the tubular shaft and the ball nut 112 thereon, effecting a corresponding relative vertical movement of the lift rod 86 depending on the direction of rotation of the ball nut.

The supply of power to the lift mechanism on the carriage is achieved through a shaft 124 rotatably mounted on the forward face of the machine frame and extending longitudinally above the treating stations between the supporting rails 22. Rotation of the shaft 124 is achieved by a reversible lift motor 126 which is mounted on the machine framework and is mounted with the output end thereof drivingly coupled to a gear reducer 128. A drive pulley 130 is affixed to the output shaft of the gear reducer 128 around which a suitable flexible element such as a belt 132 is trained, which in turn extends around a driven pulley 134, as best seen in FIGURE 4, which is affixed to the line shaft 124. Accordingly, rotation of the lift motor in either direction will effect a corresponding rotation of the line shaft in different directions depending upon whether a lifting or a lowering movement of the lift mechanism on the carriage is desired.

A transfer of the torque from the line shaft 124 to the pulley 120 affixed to the cylindrical collar is achieved as may be best seen in FIGURE 5, by means of a splined nut 136 slidably mounted on the line shaft 124 and rotatably supported within a housing 138 securely affixed to a bracket 140 (FIGURE 4) attached to the lower brace 54. The splined nut 136, as best seen in FIGURE 5, comprises a sleeve 142 of an anti-friction material such as polyetrafluoroethylene, for example, which is locked by means of end retainer rings 144 within a tubular shaft 146 rotatably supported at its ends by means of ball bearings 148. A bevel gear 150 is splined or otherwise affixed to the periphery of the shaft 146 and is disposed in constant meshing relationship with a driven bevel gear 152 affixed to the lower end portion of a shaft 154 rotatably mounted within bearings 156. A drive pulley 158 is affixed to the upper end portion of the shaft 154 as best seen in FIGURES 4 and 5, and around which the V-belt 122 is trained and extends therefrom around the pulley 120 of the lift mechanism.

As best seen in FIGURE 4, an idler pulley 160 mounted on shaft 162 supported in bearing block 164 is disposed in bearing contact against the V-belt 122 for applying an appropriate tension thereof, avoiding any relative slippage between the several pulleys. The bearing block 164 is adjustably mounted on the upper plate 90 as shown in FIGURE 4 so as to enable adjustment of the tension of the V-belt.

In accordance with the arrangement of the drive system for the lift mechanism, it will be apparent that energization of the lift motor 126 in either direction, effects a corresponding rotation of the line shaft 124 which in turn effects a rotation of the drive pulley 158 effecting a corresponding rotation of the ball nut effecting a controlled elevating or descending movement of the work rack engaging device. The lift mechanism as typified in FIGURE 4, is movable to a fully raised position as shown in solid lines, wherein the lower portions of the work rack are disposed in clearance relationship relative to the partitions separating adjoining treating receptacles. When the lift mechanism is in the fully lowered position, as shown in phantom in FIGURE 4, the V-shaped lift memberse 104 at the ends of the work rack engaging device 32, are disposed in clearance relationship below the inwardly projecting ends 106 of the work racks enabling longitudinal movement of the carriage without effecting any interference with the work racks disposed at the stations. In that position, the work rack itself is suspended from the V-blocks 28 mounted in transverse aligned relationship at each of the work stations.

The control of the elevating and descending movement of the lift mechanism is achieved by a central control system in a manner subsequently to be described and in conjunction with an up and down position limit switch LS10, as shown in FIGURE 4, which is adapted to be tripped by a lobe 172 on a cam 166. The cam 166 is rotatably supported on a shaft 168 having a pulley 170 thereon, which in turn is drivingly coupled to the output shaft of the speed reducer 128 which also is drivingly coupled to the line shaft 124. It will be apparent that the sizing of the several pulleys is such that the cam 166 rotates in direct proportion to the ascending and descending movement of the lift mechanism which is driven through the same drive arrangement such that the disposition of the lobe 172 on the cam 166 is directly related to the position of the lift rod 86 and guide rods 88 of the lift mechanism. Actuation of up and down position limit switch LS10 is in turn effective to cause a de-energization of the lift motor 126 when the lift mechanism has attained the appropriate raised or lowered position. The tripping of limit switch LS10 is also effective to signal the central control circuit in order that the next operation of the conveying machine can be sequentially initiated.

The conveying machine as hereinbefore described, is readily adaptable for an automatic sequentially phased operating cycle providing for increased versatility in the transfer of the workpieces through the several treating stations consistent with the specific work operations to be performed. For this purpose, any one of a variety of suitable sequencing or programming means of the types well known in the art, can be satisfactorily employed in the central control circuit of the machine which is electrically connected to the several station limit switches and to the up and down lift mechanism position limit switch for effecting appropriate operation of the transfer motor and the lift motor to provide for the requisite operating cycle. The sequencing means may comprise one or combinations of stepping switches of the types employed in telephone circuitry or, alternatively, may comprise a suitable programming device such as a sequencing drum 174 as illustrated schematically in FIGURE 9 of the drawings. The sequencing drum 174, as shown in FIGURE 9, is rotatably supported on shafts 176, to one of which a driven gear 178 is affixed which in turn is disposed in constant meshing relationship with a drive gear 180 mounted on the output shaft of a control motor 182. In the exemplary arrangement as illustrated in FIGURE 9, the periphery of the sequencing drum is provided with a pair of contact rings 184 which are disposed in electrical contact with contact bushes 186. A series of contacts 188 are mounted in circumferentially spaced relationship between the contact rings 184 and are adapted to become successively disposed in electrical contact with a wiper contact 190. The circumferentially spaced contacts 188 are selectively connected to one of the contact rings 184 such that the wiper contact 190 will be sequentially positioned in appropriate electrical contact with either one of the contact bushes 186 for providing a sequential and automatically programmed energization of the transfer motor in the appropriate direction to provide movement of the carriage along the supporting rails.

The center portion of the sequencing drum 174 is formed with a plurality of contact rings 192 each of which in turn is disposed in electrical contact with wiper brushes 194 which in turn are adapted to be electrically connected, respectively, to station limit switches LS1–LS9. Adjacent to the contact rings 192 are mounted a series of circumferentially spaced contacts 196 which are adapted to be disposed in successive contact with a stationary contact bush 198 for selectively placing a certain one of the station limit switches in the circuit such that a tripping thereof will result in a de-energization of the transfer motor. The remaining station limit switches in accordance with this arrangement are not placed in the circuit such that a tripping thereof by the actuator on the carriage has no effect on the traveling movement of the carriage.

In a similar manner, the periphery of the right hand portion of the sequencing drum as viewed in FIGURE 9, is formed with two contact rings 200 which are disposed in continuous electrical contact with brushes 202 and wherein a series of circumferentially spaced contacts 204 are connected in selective electrical contact with either of the contact rings 200. A stationary wiper contact 206 is adapted to be positioned in successive electrical contact with contacts 204 which are effective to provide for selective energization and de-energization of the lift motor in the appropriate direction to effect a raising and lowering of the work racks at the specific stations to which the work carriage is transferred. Through appropriate circuitry, the up-position and down-position limit switch LS10 (FIGURE 4), is effective to de-energize the lift motor when the work rack engaging device on the lift mechanism has attained the appropriate position. Limit switch LS10 can also be effectively employed in response to a tripping thereof for intermittently energizing control motor 182 (FIGURE 9) effecting an indexing of the sequencing drum 174 to the next position at which the work carriage and the lift mechanism thereon undergo the next step of the preselected operating cycle.

It will be apparent from the foregoing that any desired operating cycle such as a cell-type electroplating operation, for example, can be performed on the conveying machine by employing a sequencing drum incorporating contacts thereon oriented to provide the requisite operating cycle. Conventionally, the peripheral portion of the sequencing drum is formed with a removable sleeve in order that substitute sleeves incorporating different programs can readily be substituted as may be required from time to time when workpieces which are to be subjected to a different treating cycle are to be processed. It will also be understood that any one of a variety of alternative satisfactory programming devices can be satisfactorily employed in lieu of the specific sequencing drum as illustrated in FIGURE 9 and as hereinabove described.

Figure 7:
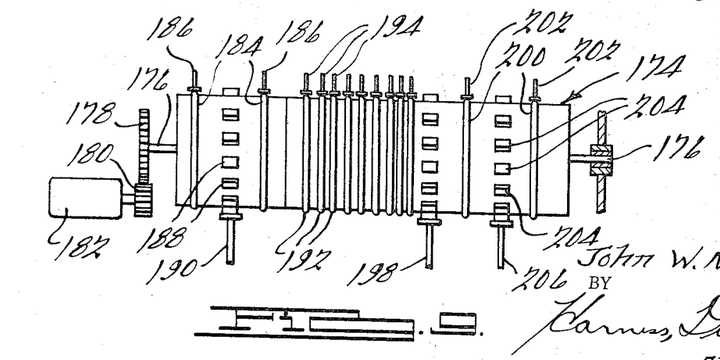
FIGURE 7 is a side elevational view of a conveying apparatus constructed in accordance with an alternative embodiment of the present invention in which a housing encloses the treating stations and the lift mechanism is sealingly and movingly disposed in the housing.
Figure 8:
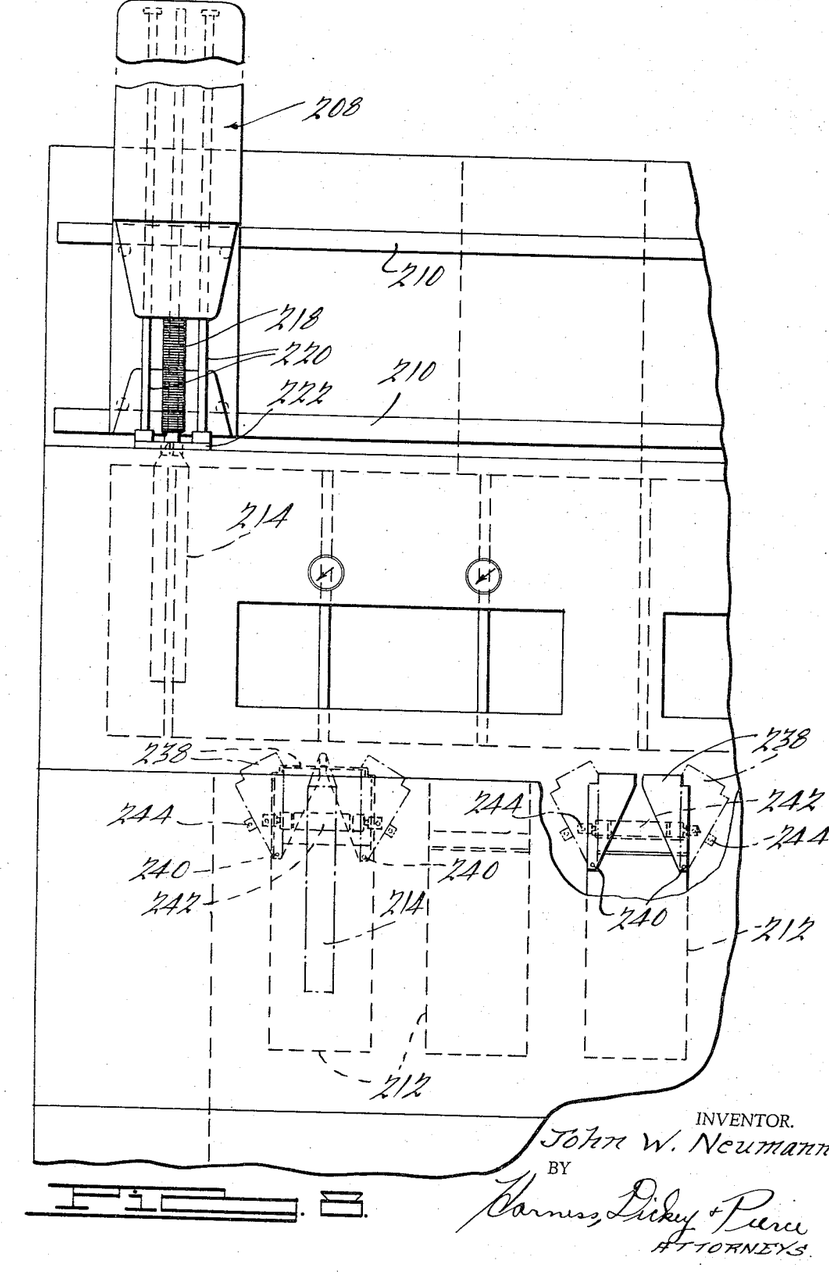
FIGURE 8 is a fragmentary front elevational view of a conveying machine illustrating still another alternative embodiment of the present invention where a cover is movably mounted on some of the treating tanks.

Alternative embodiments of the present invention are illustrated in FIGURES 7 and 8 of the drawings wherein FIGURE 7 illustrates the use of a hood for enclosing the area immediately around the treating stations so as to minimize contamination of the surrounding atmosphere by any fumes or gases evolved from the solutions as may be encountered, for example, in the course of an electroplating operation. The machines as illustrated in FIGURES 7 and 8 are of the same basic construction as previously described in connection with FIGURES 1–6 inclusive. A carriage 208 is movably mounted on support rails 210 for movement above a series of treating receptacles 212 in which various treating solutions are contained. The work racks 214 are adapted to be removably suspended from V-blocks 216 mounted in transverse alignment adjacent to each of the work stations. The lift mechanism on the carriage 208 consists of a lift rod 218 and two adjacent guide rods 220 which are oriented in longitudinal alignment in comparison to the transverse alignment embodied in the machine illustrated in FIGURES 1–6. A work rack engaging device 222 is affixed to the lower end portions of the lift rod and guide rod for engaging and supporting the work racks 214 during movement of the carriage between the treating stations.

In the embodiment as illustrated in FIGURE 7, a hood 224 extends upwardly from the upper edge of the treating receptacles and thence inwardly to a point adjacent to the face of the machine framework effecting an enclosure of the atmosphere immediately above the treating receptacles. The interior of the enclosure as defined by the hood 224, is disposed in communication with a duct 226 within the machine framework in which a blower 228 is mounted for withdrawing the gases and fumes evolved from the treating receptacles. The duct 226 as shown in FIGURE 7, is also disposed in communication with the upper area of a solution replenishment tank 230 mounted within the machine framework for continuously venting the fumes contained therein out to the atmosphere. It is also contemplated that the outlet of the duct 226 can be connected to a suitable recovery unit for recovering any of the constituents contained in the effluent gases as may be desired.

In order to minimize the escape of the gases from within the interior of the enclosure as defined by the hood 224, the upper portion of the hood is provided with a longitudinal slot indicated at 232 through which the lift rod 218 and guide rods 220 extend enabling unrestricted vertical movement thereof. A cover shield 234 is disposed around the lift rod and guide rods forming longitudinally extending forward and rearward surfaces against which the inner surface of resilient seal members 236 are disposed in sealing engagement during all moved positions of the carriage. The seal members 236 are biased toward each other so as to be disposed in contact with each other along those portions of the slot 232 when the carriage is positioned remotely therefrom. The seal members 236 may be composed of any suitable resilient material such as rubber or other elastomeric plastic materials possessing adequate abrasion resistance and flexibility to provide an adequate seal over prolonged periods of use. It will be appreciated that the sealing of the interior of the chamber as defined by the hood 224 and the longitudinally extending seal members 236 need not provide an air-tight seal but merely a seal of a magnitude to prevent substantial loss of any vapors or gases contained within the chamber outwardly into the surrounding atmosphere which may cause contamination thereof. The normal inward flow of air from the surrounding atmosphere and upwardly through the duct 226 will ordinarily prevent any loss of substantial quantities of such contaminating material through the gaps provided.

Another manner for preventing substantial loss or contamination of the surrounding atmosphere is illustrated by the construction as shown in FIGURE 8, wherein some of the treating receptacles are provided with movable cover members 238 for selectively opening and closing the top portions of the tanks. The movable cover members 238 is best seen in the right-hand side of the machine as viewed in FIGURE 8, comprise canopies of a triangular configuration which are pivotally mounted along their lower edges by means of pins 240 to permit swinging movement thereof from a closed position as shown in solid lines to an open position as shown in phantom. Pivoting movement of the cover members between the closed and open positions, can readily be achieved such as by means of a double-acting fluid actuated cylinder 242 mounted rearwardly of the receptacle and having the rod ends thereof connected to brackets 244 affixed to the cover members at a point spaced from the pivoting axis thereof. Accordingly, selected actuation of the cylinder 242 effects an automatic opening and closing of the cover members and controlled access into the upper portion of the receptacle which is coordinated with the ascending and descending movements of the lift mechanism. The signaling and actuation of the double-acting cylinder 242 in accordance with a preferred embodiment of the present invention is achieved through signals derived from the appropriate energized station limit switch when tripped as well as in response to an energization of the lift motor. When this occurs, a suitable pressurized fluid is supplied to the cylinder 242 causing an opening of the cover members at that particular station. The cover members remain in the open position until the lift mechanism has completed its ascending or descending movement as signalled by the tripping of the up-position, down-position limit switch LS10 of the lift mechanism. The cylinder 242 is thereafter again actuated effecting a closing of the cover members and remain closed until the work rack is to be withdrawn from the receptacle or a new work rack is to be lowered into a vacated receptacle in which case the foregoing operating cycle is repeated. The operation of the cover members for each receptacle, is automatically coordinated with the operation of the carriage and the lift mechanism thereon providing for automatic operation and minimizing contamination of the contents of the treating receptacle with the surrounding atmosphere.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A conveying apparatus for transferring work racks through a series of treating stations comprising a frame, rail means on said frame extending adjacent and longitudinally of said treating stations, work rack supporting means at each treating station, a carriage guidably and movably mounted on said rail means and projecting laterally therefrom over said treating stations, said carriage including a framework, a lift member mounted on said framework for movement between a raised position and a lowered position, and engaging means on said lift member for engaging and suspending a work rack therefrom, first reversible drive means on said frame extending longitudinally of said rail means and drivingly coupled to said carriage for intermitttently moving said carriage between said stations, second reversible drive means comprising a shaft rotatably mounted on said frame and extending longitudinally of said rail means, reversible motor means drivingly coupled to said shaft for effecting intermittent rotation thereof, driven means on said carriage drivingly coupled to said lift member and slidably coupled to said shaft of said second drive means in all moved positions of said carriage and operative in response to said second drive means to effect a lifting and a lowering of said lift member, sensing means associated with said carriage at each said station for sensing the vertically aligned relationship between said lift member and said supporting means, and control means operative in response to said sensing means for selectively energizing and de-energizing said first and said second drive means for intermittently moving said carriage and said lift member in a preselected ordered sequence and conveying the work racks through the treating stations.

2. The conveying apparatus as defined in claim 1, further characterized in that at least one of said treating stations includes a treating receptacle having movable cover means thereover movable to and from an open position and a closed position and means for moving said cover means between said open position and said closed position in coordination with the operation of said carriage and said lift member thereon to provide access for depositing and removing a work rack from the treating station.

3. A conveying apparatus for transferring work racks through a series of treating stations comprising a frame, rail means on said frame extending adjacent and longitudinally of said treating stations, work rack supporting means at each treating station, a carriage guidably and moveably mounted on said rail means and projecting laterally therefrom over said treating stations, said carriage including a framework, a lift member mounted on said framework for movement between a raised position and a lowered position, and engaging means on said lift member for engaging and suspending a work rack therefrom, first reversible drive means on said frame extending longitudinally of said rail means and drivingly coupled to said carriage for intermittently moving said carriage between said stations, second reversible drive means extending longitudinally of said rail means, driven means on said carriage drivingly coupled to said lift member and to said second drive means in all moved positions of said carriage and operative in response to said second drive means to effect a lifting and a lowering of said lift member, sensing means associated with said carriage at each said station for sensing the vertically aligned relationship between said lift member and said supporting means, control means operative in response to said sensing means for selectively energizing and de-energizing said first and second drive means for intermittently moving said carriage and said litf member in a preselected ordered sequence and conveying the work racks through the treating stations, and closure means extending around and longitudinally of the series of treating stations, said closure means formed with a longitudinally extending aperture through which said lift member extends, and seal means disposed along said aperture for sealingly engaging said lift member in all moved positions thereof.

4. The conveying apparatus as defined in claim 3, wherein the interior of said closure means are disposed in communication with conduit means within said framework for withdrawing gases evolved from the interior of said closure means and venting them to a point remotely disposed therefrom.

5. A conveying apparatus for transferring work racks through a series of treating stations comprising a frame, rail means on said frame extending adjacent and longitudinally of said treating stations, work rack supporting means at each treating station, a carriage guidably and movably mounted on said rail means and projecting laterally therefrom over said treating stations, said carriage including a framework, a litf member mounted on said framework for movement between a raised position and a lowered position, and engaging means on said lift member for engaging and suspending a work rack therefrom, first reversible drive means on said frame extending longitudinally of said rail means and drivingly coupled to said carriage for intermittently moving said carriage between said stations, second reversible drive means extending longitudinally of said rail means, driven means on said carriage drivingly coupled to said lift member and to said second drive means in all moved positions of said carriage and operative in response to said second drive means to effect a lifting and a lowering of said lift member, sensing means associated with said carriage at each said station for sensing the vertically aligned relationship between said lift member and said supporting means, control means operative in response to said sensing means for selectively energizing and de-energizing said first and said second drive means for intermittently moving said carriage and said lift member in a preselected ordered sequence and conveying the work racks through the treating stations, and a cover member on at least one of the treating stations, said cover member comprising a pivotally mounted panel movable to and from an open position in which access is provided into the interior of said station to a closed position in substantial sealing relationship thereover, power means drivingly coupled to said panel for effecting movement thereof between the positions, second sensing means for sensing said raised position and said lowered position of said lift member on said carriage, and means including said control means for automatically energizing said power means in response to energization of said second reversible drive means effecting an opening of said panel and for actuating said power means to effect a closing of said panel in response to a signalling of said second sensing means that said lift member has attained the raised or lowered position.

References Cited

UNITED STATES PATENTS

| | | | |
|---|---|---|---|
| 1,051,728 | 1/1913 | German. | |
| 2,902,181 | 9/1959 | Hauck | 214—89 |
| 2,912,989 | 11/1959 | Borodin | 134—76 |
| 2,936,082 | 5/1960 | Alimanestiano | 212—71 X |
| 2,958,331 | 11/1960 | Borodin | 134—76 |
| 2,990,071 | 6/1961 | Davis et al. | 214—89 |
| 3,106,927 | 10/1963 | Madwed | 134—76 |

FOREIGN PATENTS 870,463  6/1961  Great Britain.

EVON C. BLUNK, *Primary Examiner.*

M. L. AJEMAN, *Assistant Examiner.*